United States Patent [19]

Marsden et al.

[11] Patent Number: 4,893,505
[45] Date of Patent: Jan. 16, 1990

[54] SUBSURFACE FORMATION TESTING APPARATUS

[75] Inventors: Michael J. Marsden, Houston; Wade M. Johnson, Jr., Cypress, all of Tex.

[73] Assignee: Western Atlas International, Inc., Houston, Tex.

[21] Appl. No.: 146,489

[22] Filed: Mar. 30, 1988

[51] Int. Cl.⁴ .............................................. E21B 47/06
[52] U.S. Cl. ........................................ 73/155; 73/708
[58] Field of Search ................. 73/151, 152, 154, 155, 73/708; 166/100, 264

[56] References Cited

U.S. PATENT DOCUMENTS 3,530,933 9/1970 Whitten ................................ 166/100
4,607,530 8/1986 Chow ...................................... 73/708

Primary Examiner—Jerry W. Myracle
Attorney, Agent, or Firm—Patrick H. McCollum

[57] ABSTRACT

Apparatus for collecting a plurality of samples of fluids in earth formations traversed by a wellbore includes a pressure sensor for deriving a pressure measurement and a temperature sensor for simultaneously deriving a temperature measurement. The pressure measurement signals and the temperature measurement signal are transmitted to processing circuitry using a narrow band frequency modulated scheme. The temperature measurement is used to provide a real time temperature compensated pressure measurement.

29 Claims, 8 Drawing Sheets

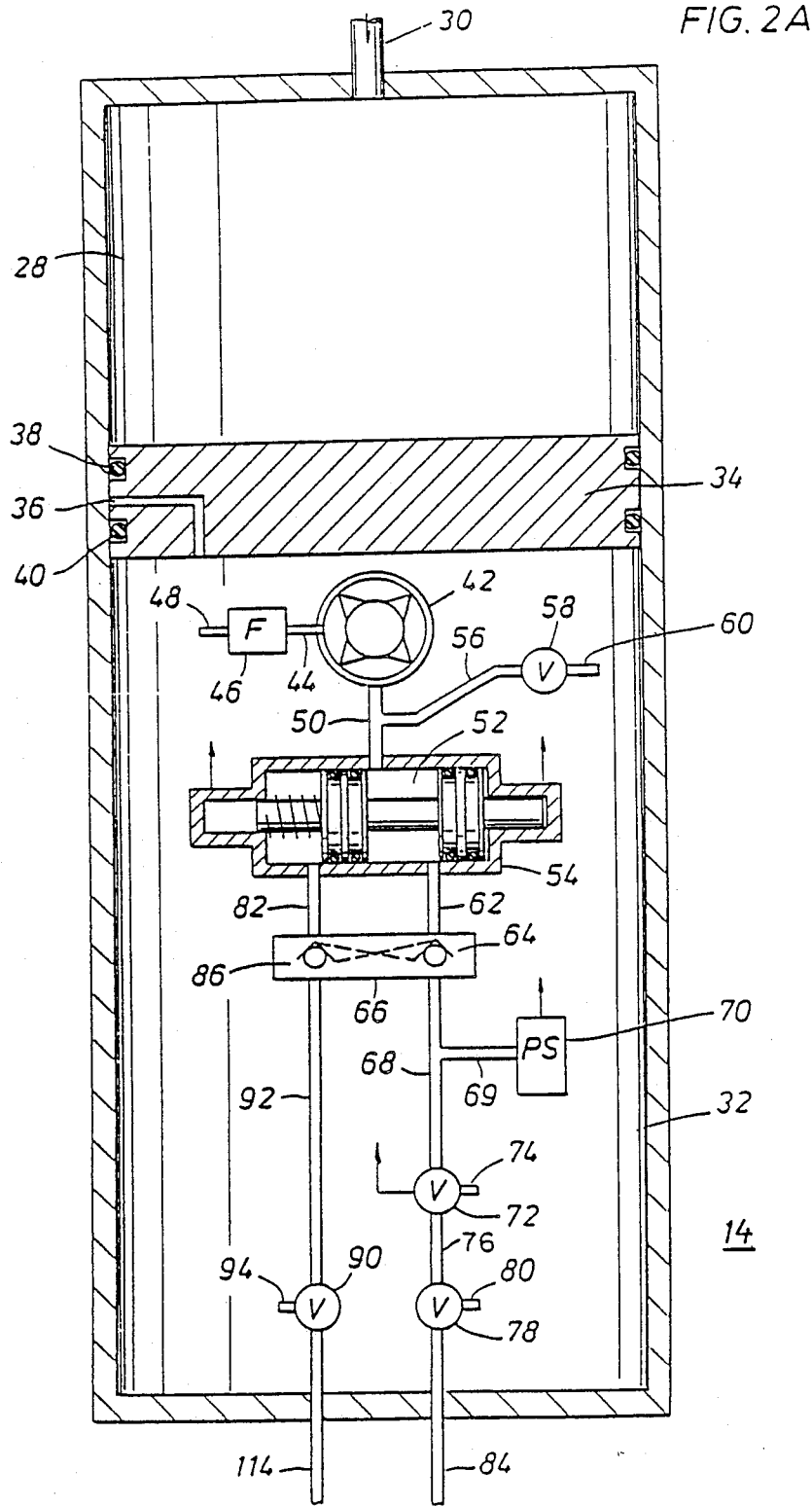

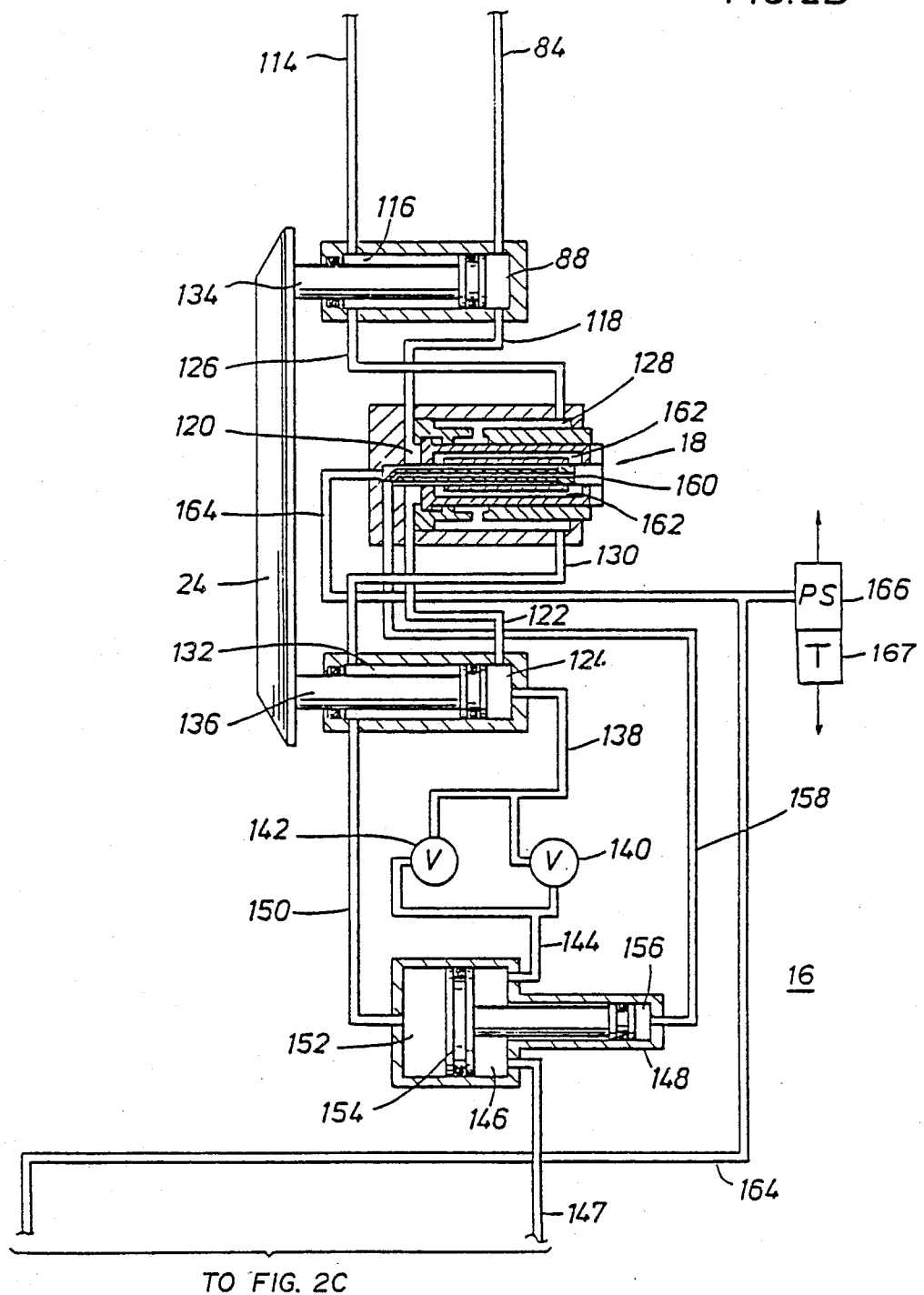

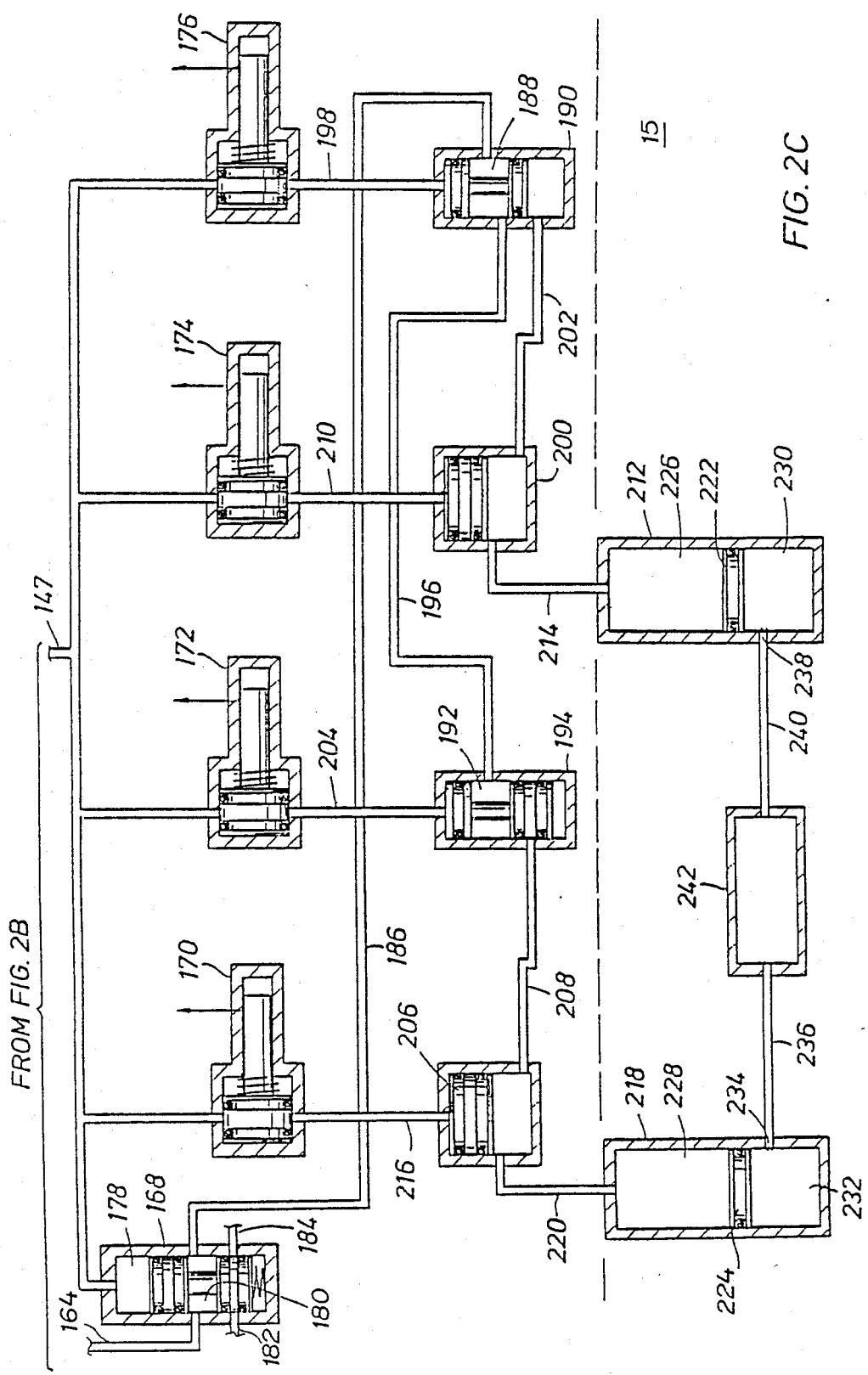

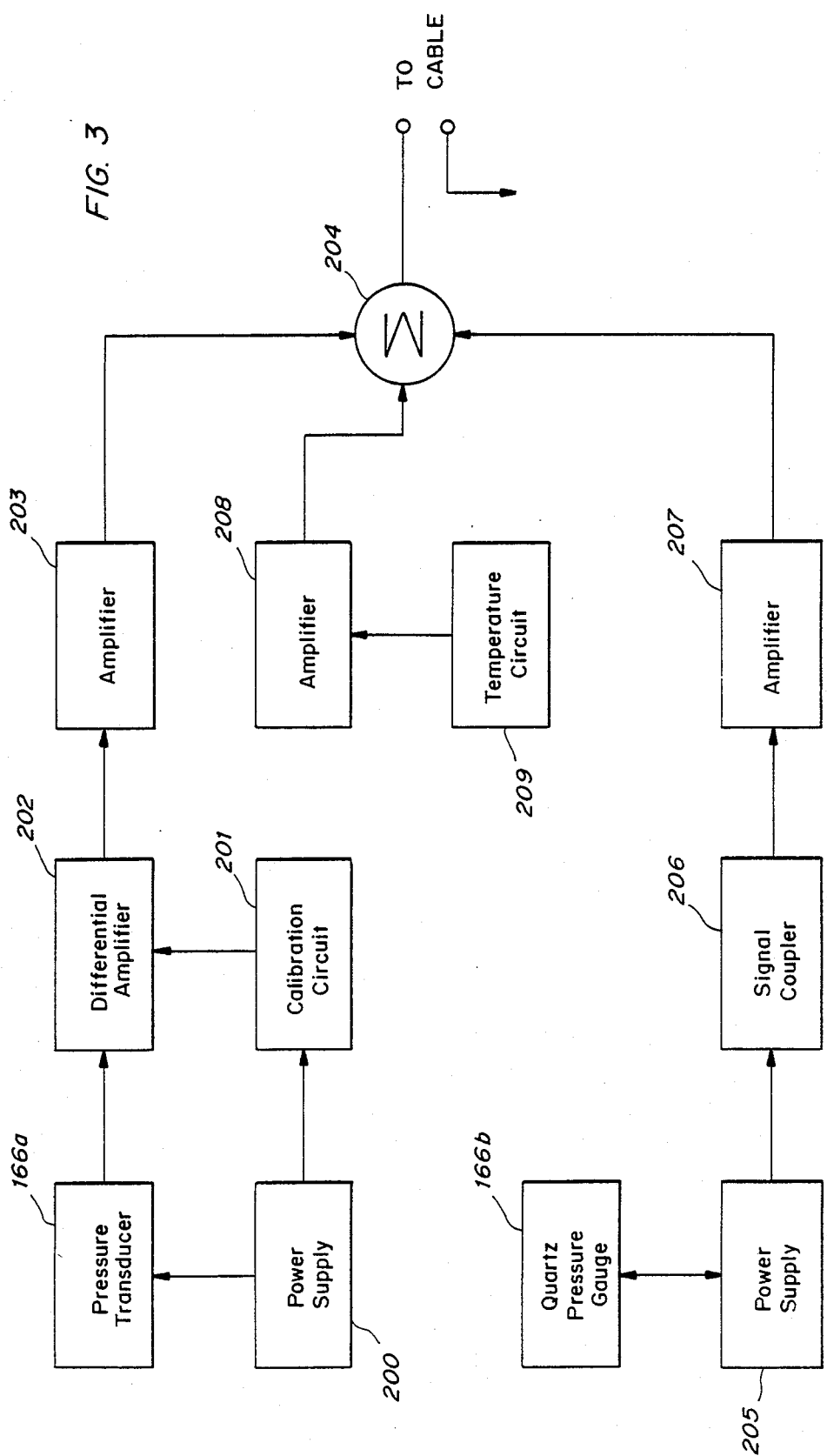

SUBSURFACE FORMATION TESTING APPARATUS

BACKGROUND OF THE INVENTION

This invention relates, in general, to subsurface formation testing apparatus, and more particularly to methods and apparatus for providing real time simultaneous measurements of pressure and temperature of fluid samples from subsurface earth formations traversed by a borehole.

The sampling of fluids contained in subsurface earth formations provides a method of testing formation zones of possible interest by recovering a sample of any formation fluids present for later analysis at the earth's surface while causing a minimum of damage to the tested formations. Thus, the formation sampler is essentially a point test of the possible producibility of subsurface earth formations. Additionally, a continuous record of the sequence of events during the test is made at the surface. From this record valuable formation pressure and permeability data can be obtained for formation reservoir analysis.

Early formation fluid sampling instruments, such as the one described in U.S. Pat. No. 2,674,313, were not fully successful as a commercial service because they were limited to a single test on each trip into the borehole. Later instruments were suitable for multiple testing; however, the success of these testers depended to some extent on the characteristics of the particular formations to be tested. For example, where earth formations were unconsolidated a different sampling apparatus was required than in the case of consolidated formations.

One major problem which has hampered the reliable testing of subsurface earth formations has been in obtaining an accurate and repeatable measurement of the subsurface formation pressure. The typical subsurface formation testing instrument employed only a pressure sensor. Temperature corrections to the pressure measurement comprised a manual correction based on a temperature measurement derived at a spaced-apart location within the wellbore. A typical system utilizes a thermometer located within a cable head which records the maximum wellbore temperature. When the sampling instrument is returned to the surface the recorded temperature measurement is used to correct the pressure measurement.

Accordingly, the present invention overcomes the deficiencies of the prior art by providing method and apparatus for providing real time, simultaneous measurements of the pressure and the temperature of fluid samples from subsurface earth formations and methods and apparatus for correcting the pressure measurements for the effects of temperature.

SUMMARY OF THE INVENTION

Apparatus for obtaining a plurality of formation fluid samples and subsurface measurements according to the present invention includes a fluid admitting member and a fluid sampling and measuring instrument. The instrument includes a hydraulic power system having a hydraulic pump and a plurality of solonoid control valves for controlling the application of hydraulic pressures to various elements of the instrument to facilitate obtaining samples of formation fluids. A fluid admitting member is telescopically extensible from the instrument into sealing engagement with potentially producible earth formations. When the fluid admitting member is fully extended and a test of the formation fluids present is taken. The pressure and temperature of the point of sample are measured and electrical signals are generated and transmitted to a surface processor using a narrow-band frequency modulated transmission scheme. At the surface, the temperature measurement is used to correct the pressure measurement and a signal representative of the temperature corrected pressure measurement is generated.

BRIEF DESCRIPTION OF THE DRAWINGS

FIG. 2A-C together show a somewhat schematic representation of the formation testing instrument illustrated in FIG. 1.

FIG. 3 is a schematic diagram, partly in block form, of a portion of the subsurface pressure and temperature circuits.

DETAILED DESCRIPTION OF THE PREFERRED EMBODIMENT

Figure 1:
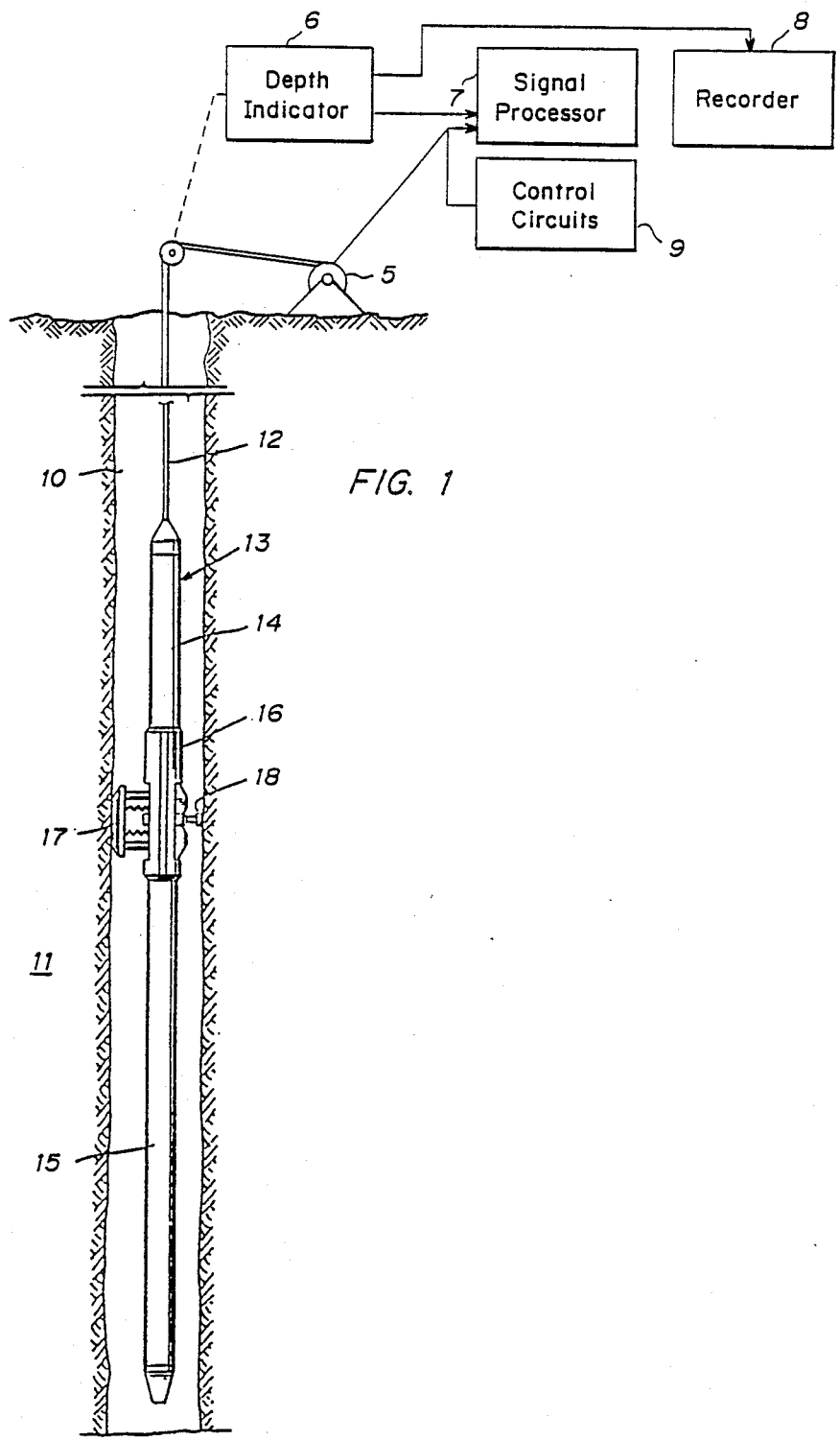
FIG. 1 is a pictorial view, partly in cross-section, of a formation test instrument disposed in a borehole and the surface located control and processing system.

Referring now to the drawings in more detail, particularly to FIG. 1, there is illustrated schematically a section of a borehole 10 penetrating a portion of the earth formations 11, shown in vertical section. Disposed within borehole 10 by means of a cable or wireline 12 is a sampling and measuring instrument 13. The sample and measuring instrument 13 is comprised of a hydraulic power system and electronic section 14, a fluid sample storage section 15 and a sampling mechanism section 16. Sample mechanism section 16 includes selectively extensible well engaging pad member 17 and a selectively extensible fluid admitting member 18.

In operation, sampling and measuring instrument 13 is positioned within borehole 10 by winding or unwinding cable 12 from hoist 5, around which cable 12 is spooled. Depth information from depth indicator 6 is coupled to signal processor 7 and recorder 8. When instrument 13 is disposed adjacent an earth formation of interest electrical control signals from control circuits 9 are transmitted through electrical conductors contained within cable 12 to instrument 13. These electrical control signals activate a hydraulic pump (not shown) within the hydraulic power system section 14 causing the well engaging pad member 17 and the fluid admitting member 18 to move laterally from instrument 13 into engagement with the earth formations 11. Fluid admitting member 18 can then be placed in fluid communication with the earth formations 11 by means of electrical control signals from control circuits 9 selectively activating solonoid valves (not shown) within instrument 13 for the taking of a sample of any producible connate fluids contained in the earth formations. A more complete description of the apparatus of instrument 13 can be found in U.S. Pat. No. 4,434,653 issued Mar. 6, 1984 to Marshall N. Montgomery and assigned to the assignee of the present invention, which is incorporated herein by reference.

Referring now to FIG. 2A through 2C, there is illustrated a somewhat schematic representation of the hydraulic power system section 14, the sampling mechanism section 16 and the fluid sample storage section 15 of sampling and measuring instrument 16. The hydraulic power system section 14 includes an upper borehole fluid chamber 28, which is in fluid communication with the borehole through passage 30, and a lower hydraulic fluid chamber 32, which contains a hydraulic fluid such as oil or the like. Disposed between the upper borehole fluid chamber 28 and the lower hydraulic fluid chamber 32 is a free-floating isolation piston 34. Isolation piston 34 serves to not only isolate the upper borehole fluid chamber 28 from the lower hydraulic fluid chamber 32 but also maintains the hydraulic fluid within the hydraulic fluid chamber 32 at a pressure about equal to the hydrostatic pressure at whatever depth the tool is situated in the borehole, as well as for accommodating for volumetric changes in the hydraulic fluid which may occur under various borehole conditions. A passage 36 is provided within piston 34 from hydraulic fluid reservoir 32 to the outside periphery of isolation piston 34 between o-rings 38 and 40 to prevent pressure locking of the isolation piston 34.

Since sampling and measuring instrument 13 is to be operated at great depths within boreholes which can contain dirty and unusually corrosive fluids, housed within the protection of hydraulic fluid chamber 32 is hydraulic pump 42, which in the preferred embodiment is an electrically powered, rotary, positive-displacement type hydraulic pump. Hydraulic pump 42 has a first hydraulic line or conduit 44 connecting to fluid filter 46 which further communicates with lower hydraulic fluid chamber 32 by hydraulic line 48. A second hydraulic line 50 connects hydraulic pump 42 with fluid chamber 52 within valve assembly 54. Valve assembly 54 can comprise any suitable dual-position electricially controllable hydraulic valve, for example, such as Model NWE-5-N/6.0/OF-22V60NZ4V, sold by Rothrex, Inc. Branchingly connected to hydraulic line 50 is hydraulic line 56 which connects to pressure regulating valve 58 which further communicates with hydraulic fluid chamber 32 through hydraulic line 60.

Fluid chamber 52 of valve assembly 54, in the valve position shown, connects through hydraulic line 62 to a first check valve section 64 of dual pilot check valve 66. The output of first check valve section 64 is branchingly coupled through hydraulic line 68 to hydraulic fluid pressure sensor 70 and to electrically controllable dump valve 72. Dump valve 72 communicates with hydraulic fluid chamber 32 through hydraulic line 74. A second hydraulic line 76 from dump valve 72 connects to relief valve 78. From relief valve 78 a first hydraulic line 80 communicates with hydraulic fluid chamber 32 and a second hydraulic line 84 connects to well engaging member extender chamber 88.

A third hydraulic line 82 connects from valve assembly 54 to a second check valve section 86 of dual pilot check valve 66. The output of second check valve section 86 connects to relief valve 90 by hydraulic line 92. Relief valve 90 connects to hydraulic fluid chamber 32 through hydraulic line 94 and connects to well engaging member piston retractor chamber 116 through hydraulic line 114.

Well engaging member piston extender chamber 88 is coupled through hydraulic line 118 to fluid admitting member extender chamber 120 which is further coupled through hydraulic line 122 to well engaging member piston extender chamber 124. Well engaging member piston retractor chamber 116 is coupled through hydraulic line 126 to fluid admitting member retractor chamber 128 which is further coupled through hydraulic line 130 to well engaging member piston retractor chamber 132. Well engaging pad member pistons 134 and 136 are longitudinally a spaced pair of laterally moveable pistons arranged traversely on the body of sampling and measuring instrument 13. Pistons 134 and 136 are arranged to provide contemporaneous expansion of well engaging pad member 17 and fluid admitting member 18. Conversely, pistons 134 and 136 cooperate to provide contemporaneous retraction of well engaging pad member 24 and fluid admitting member 26.

Piston extender chamber 124 couples to hydraulic line 138 which branchingly couples to relief valve 140 and check valve 142. Relief valve 140 and check valve 142 are coupled through hydraulic line 144 to fluid chamber 146 within pre-test sample assembly 148. Fluid chamber 146 is branchingly coupled through hydraulic line 147 to fluid chamber 178 of equalizer valve 168, solenoid valve 170, solenoid valve 172, solenoid valve 174 and solenoid valve 176. Solenoid valves 170, 172, 174 and 176 can be any suitable electrically controllable hydraulic control valves, such as those sold by ATKOMATIC VALVE COMPANY, under part number 15-885. These valves are controlled by an electrical command and switching system known in the art, such as the system described in U.S. Pat. No. 3,780,575, which is incorporated herein by reference.

Piston retractor chamber 132 is coupled through hydraulic line 150 to fluid chamber 152 within pre-test sample assembly 148. Fluid chamber 146 and fluid chamber 152 are fluidly isolated from one another by displacement piston 154. Pre-test sample assembly 148 includes an expansible pre-test fluid sample chamber 156 coupled through fluid line 158 to a central bore 160 within fluid admitting member 18. In the preferred embodiment, pre-test fluid sample chamber is designed to hold a relative small amount of formation fluids such as a volume from between 10 cc to 20 cc.

Fluid admitting member 18 is provided with second coaxial fluid passages 162 connecting to fluid line 164 which branchingly connects to formation pressure sensor 166, temperature sensor 167, and fluid chamber 180 within equalizer valve 168. Additionally, equalizer valve 168 can be placed in fluid communication with the borehole by conduits 182 and 184. Fluid chamber 180 of equalizer valve 168 couples through fluid line 186 to fluid chamber 188 within first sample storage tank control valve 190. Fluid chamber 188 further connects to fluid chamber 192 within second sample storage tank control valve 194 by fluid line 196. First sample storage tank control valve 190 connects to solenoid valve 176 by hydraulic line 198 and connects to first sample storage tank lock valve 200 by fluid line 202. Second sample storage tank control valve 194 connects to solenoid valve 172 by hydraulic line 204 and connects to second sample storage tank lock valve 206 by hydraulic line 208. First sample storage tank lock valve 200 couples to the first sample storage tank 212 by fluid line 214. Second sample storage tank lock valve 206 couples to solenoid valve 170 by hydraulic line 216 and couples to the second sample storage tank 218 by fluid line 220.

Sample storage tanks 212 and 218 are divided into two separate fluid cavities by floating pistons 222 and 224, respectively. The upper chamber of tank 212 comprises a fluid sample storage chamber 226 with the upper chamber of tank 218 forming a second fluid sample storage chamber 228. Lower chamber 230 of tank 212 and the lower chamber 232 of tank 218 comprise water reservoirs. Water reservoirs 232 and 230 are respectively coupled through flow control orifice 234 and water line 236, and flow control orifice 238 and water line 240 to water cushion storage tank 242.

In the operating of the sampling and measuring instrument of FIG. 2, instrument 13 is positioned within a borehole opposite earth formations to be tested. Borehole mud and fluids enter borehole fluid chamber 28 by passage 30 which communicates with the borehole 10. The weight of the borehole fluid column is exerted as hydrostatic pressure within borehole fluid chamber 28, with this hydrostatic pressure acting on isolation piston 34 to produce counterbalancing pressure in the hydraulic fluid of the power system. As the sampling and measuring instrument 13 is lowered into the borehole, the hydrostatic pressure increases and forces isolation piston 34 to move downward towards sampling mechanism section 16. The movement of piston 34 compresses the volume of the hydraulic fluid in chamber 32, causing a corresponding increase in fluid pressure throughout the hydraulic system. Isolation piston 34 movement stops when the hydraulic system fluid pressure reaches a value approximately equaling the hydrostatic pressure. To prevent pressure locking of isolation piston 34, passage 36 supplies hydraulic fluid from hydraulic fluid reservoir 32 to the outside pheriphery of isolation piston 34, between o-ring seals 38 and 40.

When sampling and measuring instrument 13 is positioned within a borehole at a desired sampling location, energizing voltages from an electrical command unit (not shown) are supplied to motor driven hydraulic pump 42, valve assembly 54 and spring loaded dump valve 72. These command signals shift and hold the piston within fluid chamber 52 of valve assembly 54 to the pump forward (PF) position, as illustrated by the position of the piston in FIG. 2A; activates motor driven hydraulic pump 42; and maintains dump valve 72 in a de-energized position. The rotation of hydraulic pump 42 draws hydraulic fluid from hydraulic fluid reservoir 32 through hydraulic line 48, filter 46, hydraulic line 44 and into hydraulic pump 42 being further pumped through hydraulic line 50 into fluid chamber 52 of valve assembly 54. Hydraulic fluid is pumped also from hydraulic fluid pressure flow to peak from preferably between 1700 psi and 1750 psi before unseating and opening a return path through hydraulic line 60 to hydraulic fluid chamber 32.

The PF hydraulic fluid flow travels from fluid chamber 52 through hydraulic line 62 to first check valve section 64 of dual pilot check valve 66. First check valve section 64 allows hydraulic fluid flow there through while pressure biasing second check valve section 86 of dual pilot check valve 66 in a closed position. Hydraulic fluid flow travels through hydraulic line 68 to dump valve 72 and through branch hydraulic line 69 to hydraulic fluid pressure sensor 70. Hydraulic fluid pressure sensor is preferably a Bourdon pressure gauge which converts the hydraulic fluid pressure into an electrical signal which is transmitted to the surface electronic section. The PF hydraulic fluid flow moves through dump valve 72 and hydraulic line 76 to relief valve 78. Relief valve 78 is preset at a pressure level slightly higher than that at pressure regulating valve 58 to allow hydraulic fluid flow to return through hydraulic line 80 into hydraulic fluid chamber. Preferably, relief valve 78 is set to unseat from between 1725 psi and 1775 psi. PF hydraulic fluid flow moves through relief valve 78, through hydraulic line 84 into piston extender chamber 88, further passing through hydraulic line 118 into fluid admitting member extender chamber 120, continuing through hydraulic line 122 into piston extender chamber 124. The output signal from hydraulic fluid pressure sensor 70 increases as the hydraulic fluid pressure surge forces pistons 134 and 136 to move well engaging pad member 17 laterally in relation to the longitudinal axis of the instrument into contact with the borehole of the well. Contemporaneous with the lateral extension of well engaging pad member 17, the PF hydraulic fluid pressure within fluid admitting member extender chamber 120 extends the components of the fluid admitting member 15 in a telescoping manner forcing the leading portion of fluid admitting member through any mud cakes present and into fluid communication with the earth formations.

When the PF hydraulic fluid flow pressure reaches a predetermined value, such as, for example, 1200 psi, relief valve 140 unseats, passing hydraulic fluid flow pressure through hydraulic line 144 into fluid chamber 146 of pre-test sample assembly 148, moving displacement piston 154 rearward within pre-test sample assembly 148. The rearward movement of displacement piston 154 causes any mud cakes and formation particles in central bore 160 of fluid admitting member 18 to be pulled rearwardly within central bore 160 and causes a relatively small formation fluid to be pulled through fluid line 158 into pre-test fluid sample chamber 156. The predetermined pressure threshold which unseats relief valve 140 is selected to be of a threshold to assure that before formation fluids are taken into formation admitting member 18 for pre-test that both well engaging pad member 17 and fluid admitting member 18 are fully extended to and establish firm contact with the wall of the borehole, and that the leading portion of fluid admitting member 18 penetrates through any mud cakes on the wall of the borehole.

As previously stated, the rearward movement of displacement piston 154 within pre-test sample assembly 148 pulls any mud cakes and formation particles lodged within central bore 160 rearwardly within central bore 160. The rearwardly movement of mud cakes and formation particles within central bore 160 opens a number of forwardly located lateral fluid passages connecting central bore 160 to a number of coaxial fluid passages 162, placing passages 162 into fluid communication through fluid line 164 to formation pressure sensor 166, temperature sensor 167, and equalizer valve 168. Formation fluid pressures and temperatures produce output signals representative of the formation pressures and temperatures. The formation pressure sensor 166 and temperature sensor 167 output signals are transmitted to the surface signal processor 7. The pressure signal will indicate an initial pressure drop as fluids intake into pre-test sample assembly 148 with a subsequent increase and leveling off to a constant value if producible connate fluids are present within the pre-tested earth formations.

The unseating of relief valve 140 allowing hydraulic fluid flow into fluid chamber 146 of pre-test sample assembly 148 further allows hydraulic fluid flow through branch hydraulic line 147 to fluid chamber 178 of equalizer valve 168, solenoid valve 170, solenoid valve 172, solenoid valve 174 and solenoid valve 176. The PF hydraulic fluid pressure flow into fluid chamber 178 of equalizer valve 168 moves the valve piston thereby allowing passage of any formation fluids present in fluid line 164 into fluid line 186 and further into fluid chamber 188 of first sample storage tank control valve 190 and through fluid line 196 into fluid chamber 192 of second sample storage tank control valve 194.

To collect a formation sample, an electrical command signal is transmitted to solenoid valve 176 which shifts the valve piston within solenoid valve 176 opening a PF hydraulic fluid path through hydraulic line 198 to first sample storage tank control valve 190 shifting the piston in this valve, allowing formation fluids to pass through fluid line 202, through first sample storage tank lock valve 200, which is a normally open lock valve, through fluid line 214 and into fluid sample storage chamber 226 of first sample storage tank 212. When a suitable sample has been accumulated in sample storage chamber 226 an electrical command signal is transmitted to solenoid valve 174 opening a PF hydraulic fluid path through hydraulic line 210 to first sample storage tank lock valve 200 shifting the valve piston blocking the fluid path to first sample storage tank 212, with the collected fluid sample retained therein. In a similar manner, a fluid sample is collected and retained within a second sample storage tank 218 by electrical command signals to solenoid valves 172 and 170.

Formation fluids entering fluid sample storage chamber 226 or fluid sample storage chamber 228 at their formation zone pressures moves the respective floating piston 222 or 224 toward the bottom of first sample storage tank 212 or second sample storage tank 218, respectively. The downward movement of floating piston 222 or 224 displaces fluid, such as water, contained within the appropriate water reservoir 230 or 232. Water is returned to water cushion tank 242 through flow control orifice 238 or 234 at a steady, predictable rate established by the size of the orifice. A more complete description of the water cushion system can be found in the aforementioned U.S. Pat. No. 3,011,554, which has been incorporated herein by reference.

When it is determined by the pre-test that the earth formations are unsuited for testing or when a formation sample has been obtained electrical command signals are transmitted to dump valve 72 and valve assembly 54, opening dump valve 72 through hydraulic line 74 into hydraulic fluid chamber 32 and shifting the piston in fluid chamber 52 of valve assembly 54 thereby opening hydraulic line 82 into fluid chamber 52 and sealing hydraulic line 62 therefrom. With valve assembly 54 in this position, rotation of hydraulic pump 42 provides pump reverse pressure flow (PR). Hydraulic pump 42 draws fluid from hydraulic fluid chamber 32 through hydraulic line 48, filter 46, and hydraulic line 44 into hydraulic pump 42 further being pumped through hydraulic line 50 into fluid chamber 52 of valve assembly 54. The pressurized hydraulic fluid passes through hydraulic line 82 and unseats check valve 86 entering hydraulic line 92 and flowing into pressure regulating valve 90. Pressure regulating valve 90 allows the PR flow pressure to peak preferably between 1700 and 1750 psi before unseating and opening a return line through hydraulic line 94 into hydraulic fluid chamber 32. Hydraulic pressure is coupled also to first check valve section 64 of dual pilot check valve 66 for sealing purposes to prevent fluid bleed-back therethrough.

The PR hydraulic fluid flow passes from pressure regulating valve 90 through hydraulic line 114 into piston retractor chamber 116. From piston retractor chamber 116 hydraulic fluid pressure passes through hydraulic line 126 into fluid admitting member retractor chamber 128 further passing through hydraulic line 130 into piston retractor chamber 132. The PR hydraulic flow moves pistons 134 and 136 rearwardly retracting well engaging pad member 17 from contact with the borehole wall. On the opposite side of the sampling and measuring instrument 13 of the PR hydraulic pressure flow telescopically retracts fluid admitting member 18. Moving from piston retractor chamber 132 through hydraulic line 150 hydraulic fluid flows into fluid chamber 152 of pre-test sample assembly 148 pushing displacement piston 154 forward. This movement of displacement piston 154 forces formation fluids within fluid chamber 156 through fluid line 158 and central bore 160 of fluid admitting member 18, forcing any mud cakes and formation particles in central bore 160 to be displaced and pushed into the borehole. Hydraulic fluid from fluid chamber 146 is displaced through check valve 142 into the PF hydraulic line system back into hydraulic fluid chamber 32.

Additionally, when hydraulic pump 42 operates to create PR hydraulic fluid flow spring-loaded piston of equalizer valve 168 shifts. In this valve position a borehole fluid path is provided through fluid lines 182 and 184 into fluid line 164 and coaxial fluid passage 162 returning to the borehole. The pressure of the borehole fluid flow counteracts the pressure exerted externally on fluid admitting member 18 by the borehole fluids and aids the PR pressure flow in retracting fluid admitting member 18. The borehole fluid flow also serves to clean any formation particles from coaxial fluid passages 162.

Referring now to FIG. 3, there is illustrated in block diagram form a portion of the electronic circuitry contained in subsurface instrument 13. As previously discussed pressure sensor 166 and temperature sensor 167 are mounted with an subsurface instrument 13 and coupled into fluid sample line 164. In actual practice, pressure sensor 166 can be a strain guage type pressure transducer 166a, such as a Bourdon pressure guage, and/or a quartz pressure guage 166b, such as a Hewlett-Packard model 2813B. Both pressure guages convert the formation fluid pressures into an electrical output signal. Coupled into strain guage pressure transducer 166a is one output from power supply 200, the second output of which is coupled into calibration circuit 201. The electrical signal output from pressure transducer 166a is coupled into differential amplifier 202 the other input of which is coupled to the output of calibration circuit 201. The output of differential amplifier 202 is coupled into the input of amplifier 203 the output of which is coupled into one input of a summing line-driver amplifier circuit 204.

Figure 4:
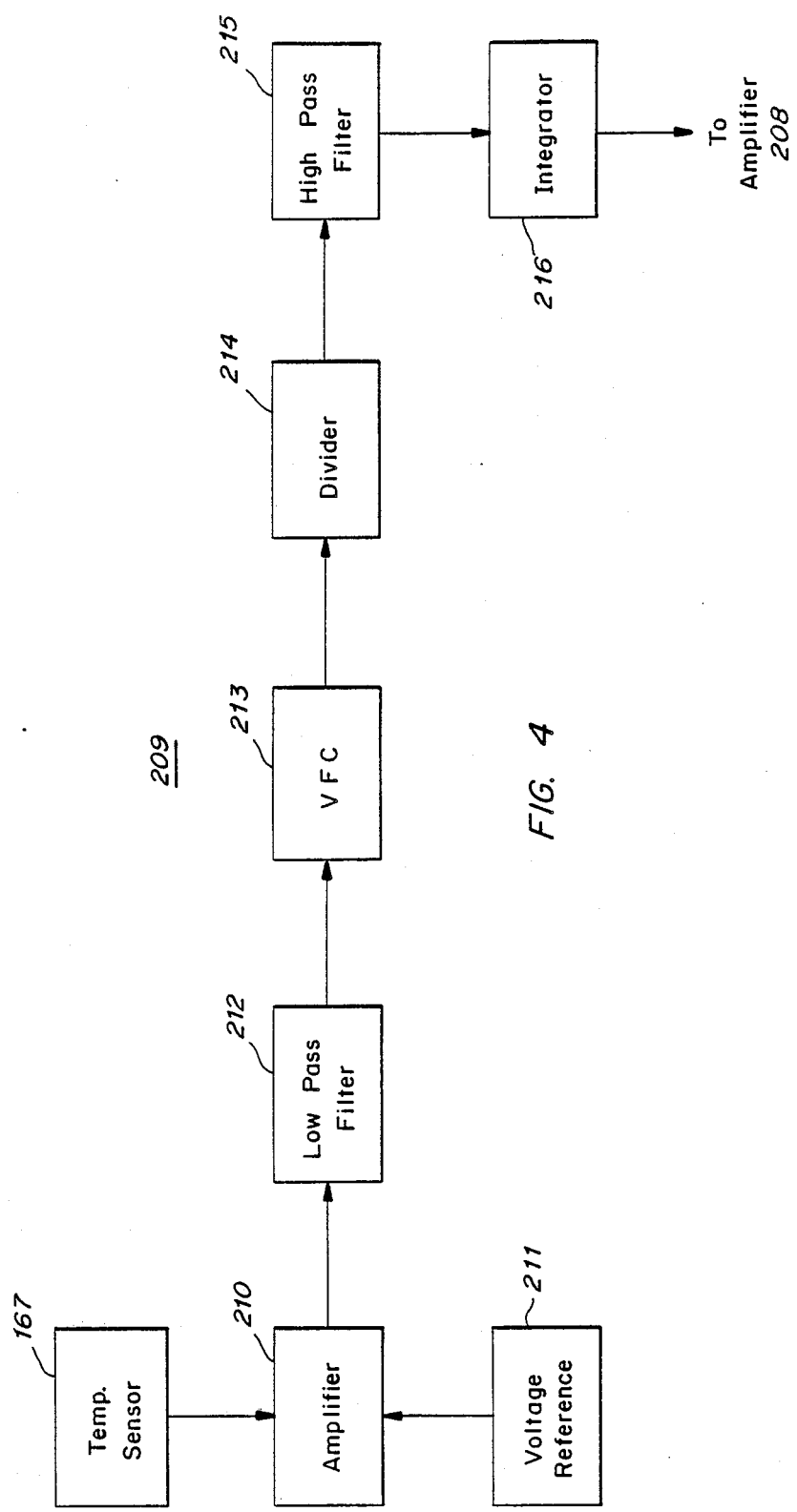
FIG. 4 is a block diagram of the temperature circuits shown in FIG. 3.

The electrical signal output from pressure transducer 166b is coupled through power supply 205 into the input of signal coupler 206 the output of which is coupled into the input of amplifier 207. The output of amplifier 207 is coupled into a second input of summing line-driver circuit 204, the output of which is connected to an electrical conductor in cable 12. The third input of summing line-driver circuit 204 is provided from the output of amplifier 208 the input of which is coupled to the output of temperature circuit 209. Referring now to FIG. 4 there is illustrated in block diagram form a more detailed view of temperature circuit 209. Temperature sensor 167 is coupled to a variable gain amplifier 210 the other input of which is coupled to the output of voltage reference 211. The output of amplifier 210 is coupled into low-pass filter 212 the output of which is coupled into voltage-to-frequency converter 213. The output of converter 213 is coupled into the input of divider 214 the output of which is coupled into high-pass filter 215. The output of filter 215 is coupled into integrator 216 the output of which is connected to amplifier 208, illustrated in FIG. 3.

In the operation of the electronic circuitry illustrated in FIGS. 3 and 4, the pressure and temperature of each formation sample is simultaneously measured by pressure sensor 166a and/or 166b, and temperature sensor 167. In the case of strain guage pressure transducer 166a, fluid pressures alter the electrical resistance within an electrical resistance bridge. Imbalancing the electrical bridge produces an output voltage signal proportional to the pressure. The output voltage signal from pressure transducer 166a is coupled to one input of differential amplifier 202 the other input being an electrical calibration signal from calibration circuit 201. In the preferred embodiment, differential amplifier is set to have a gain equal to 100. The amplified output is coupled through amplifier 203 set to have a gain equal to 1.0. The electrical signal output of amplifier 203 is a direct current electrical signal in the range from 0 to 4 volts representative of the pressure measurement from transducer 166a.

In the operation of quartz pressure guage 166b, fluid pressures change the capacitance causing a change in the frequency of an oscillator. Thus, the output frequency signal is proportional to the measured pressure. This output frequency signal passes through signal coupler 206 and amplifier 207, having a gain of approximately 2.6, into summing line-driver amplifier circuit 204.

Temperature sensor 167 is a RTD type temperature sensor where the resistance varies within a range based on a corresponding temperature range. This characteristic is used to control the output of variable gain inverting amplifier 210 by placement of temperature sensor 167 in the feedback loop of an operational amplifier. As temperature sensor 167 is powered by a constant current voltage reference 211, and the input of amplifier 210 is a constant voltage, also supplied by voltage reference 211, any change in resistance of temperature sensor 167 will cause change in the output of amplifier 210. In the preferred embodiment, over the temperature range of interest, 75° F. to 400° F., the change in resistance is from 2184 ohms to 3754 ohms, representing a change in the output signal from amplifier 210 of approximately 400mVDC.

The output of amplifier 210 is coupled through a two-pole low pass inverting filter 212 having a gain equal to 2.0. The output signal from filter 212 is coupled into voltage-to-frequency converter 213 the output of which is a narrow-band frequency modulated signal. In the preferred embodiment the output of converter 213 is a square wave signal centered at 4000 Hz with +/−10% deviation, and a duty cycle of 15%. The output of converter 213 is coupled into divider 214 which is a flip-flop functioning as a divide by two counter; therefore, the duty cycle is increased to 50%.

The output of counter 214 is coupled through high-pass filter 215 to remove the DC component voltage. Filter 215 provide AC coupling and rejection of its low harmonics. The output of filter 215 is a square-wave signal which is coupled into integrator 216 where the signal is converted into a triangle-wave of a 50% duty cycle centered at 2000 Hz with +/−200 Hz nominal bandwidth. This provides a reduction of the high frequency harmonic content of the temperature signal waveform. Finally, the triangle-wave temperature signal is coupled through amplifier 208 (FIG. 3) into summing line-driver amplifier circuits. The temperature signal is combined with the pressure measurement signal from the strain guage pressure transducer 166a and/or the pressure measurement signal the quartz pressure guage 166b in a frequency multiplexed transmission scheme for communication over cable 12 with signal processor 7 located at the earth's surface.

Figure 5:
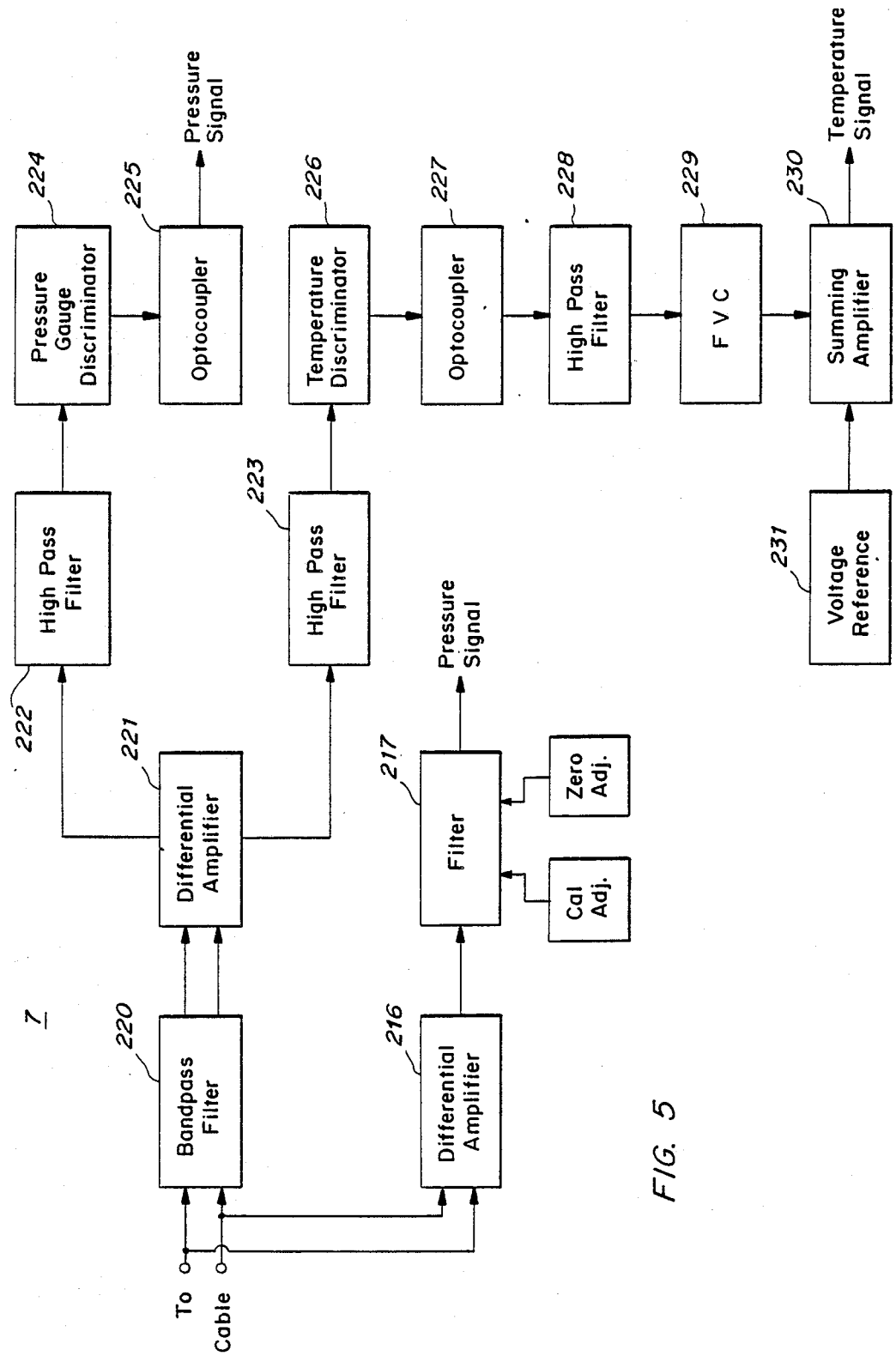
FIG. 5 is a block diagram of the surface pressure and temperature circuits shown in FIG. 1.

Referring now to FIG. 5, therein is illustrated in block diagram form from a portion of the surface signal processor 7. Cable 12 is connected into band pass filter 220 and differential amplifier 216. The output of amplifier 216 is coupled through low-pass filter 217 the output of which is an electrical signal directly proportional to the pressure measurement from pressure transducer 166a. The outputs of filter 220 are coupled into differential amplifier 221. One output of amplifier 221 is coupled into high pass filter 222, with the other output of amplifier 221 coupled into high pass filter 223. The output of filter 222 is coupled into pressure gauge discriminator 224 the output of which is coupled through optocoupler 225 the output of which is the pressure measurement signal from quartz gauge 166b.

The output of filter 223 is coupled into temperature discriminator 226. The output of temperature discriminator 226 is coupled through optocoupler 227 into high pass filter 228. The output of filter 228 is coupled into frequency to voltage converter 229 the output of which is coupled into one input of summing amplifier 230, the other input of which is connected to voltage reference 231. The output of amplifier 230 is the temperature measurement signal.

Figure 6:
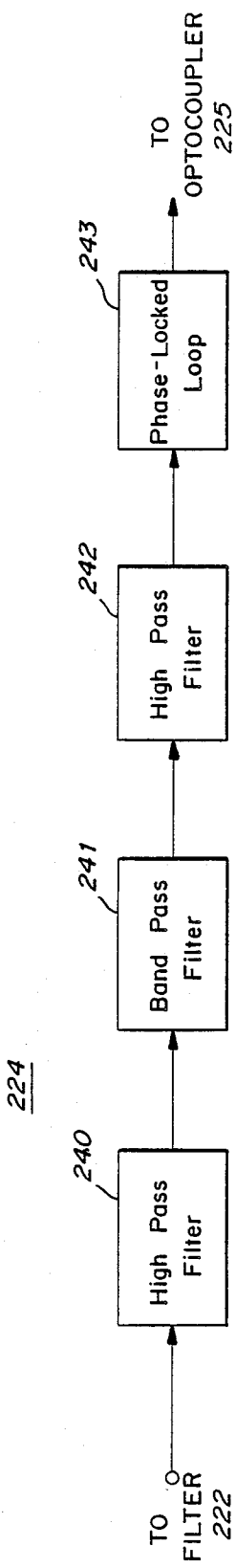
FIG. 6 is a block diagram of the quartz pressure guage discriminator circuits illustrated in FIG. 5.

Referring now to FIG. 6, there is illustrated in block form a more detailed diagram of pressure gauge discriminator 224. The output of filter 222 is coupled into high pass filter 240 the output of which is coupled through band pass filter 241 into high pass filter 242. The output of filter 242 is coupled into the input of phase-locked loop 243 the output of which is connected into optocoupler 225 (FIG. 5).

Figure 7:
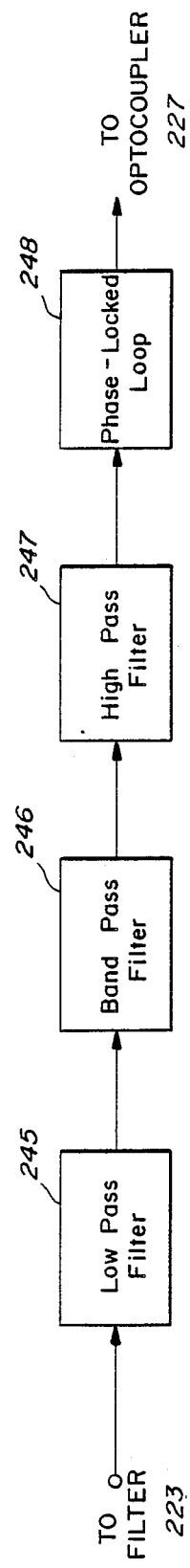
FIG. 7 is a block diagram of the temperature guage discriminator circuits illustrated in FIG. 5.

Referring now to FIG. 7, there is illustrated in block form a more detailed diagram of temperature discriminator 226. The output of filter 223 is coupled into low pass filter 245 the output of which is coupled through band pass filter 246 into high pass filter 247. The output of filter 247 is coupled into the input of phase-locked loop 248 the output of which is connected into optocoupler 227 (FIG. 5).

In the operation of the surface processing circuitry illustrated in FIGS. 5, 6 and 7, the multiplexed temperature and pressure signals from cable 12 are coupled into a balanced bandpass filter 220 and a differential amplifier 216. Differential amplifier 216 passes the DC pressure signal derived from transducer 166a into a four pole, low pass inverting filter 217 the output of which is an electrically signal directly proportional to the pressure measurement from transducer 166a, which can be displayed, recorded, and subjected to temperature correction processing.

The temperature signal from sensor 167 and the pressure signals from guage 166b pass through a balanced band pass filter 220 which excludes both high frequency noise and the lower order harmonics of the AC power. The output of filter 220 is buffered by a unity gain differential amplifier 221 and separated from the frequency multiplexed signal by filtering the quartz guage pressure signal by high pass filter 222, non-inverting high pass filter 240, band pass filter 241 and high pass filter 242 and coupled into phase-locked loop 243. Phase locked loop 243 center frequency is tuned to the center frequency of the pressure signal, 15.7 KHz. The output of phase-locked loop 243 is a square-wave signal referenced to the "floating" power supply common of the surface electronics. The pressure measurement signal is optocoupled by optocoupler 225 the output of which is a pressure measurement signal from guage 166b referenced to system ground, which can be displayed, recorded and subjected to temperature correction processing.

The temperature signal is filtered by high pass filter 223, inverting low pass filter 245, band pass filter 246 and high pass filter 247 and coupled into phase-locked loop 248. Phase locked loop 248 center frequency is tuned to the center frequency of the temperature signal, 2000 Hz, and has a bandwidth approximating the temperature signal, 1800 Hz to 2200 Hz. The temperature measurement signal is optocoupled by optocoupler 227 into high pass filter 228. In the preferred embodiment optocouplers 225 and 227 comprise a Hewlett Packard dual TTL compatible optocoupler model HCPL-2630. This device consists of a pair of inverting optically coupled gates each with a GaAsP photon emitting diode and an integrated detector. The photons are collected in the detector of a photodiode and then amplified by a high gain linear amplifier that drives a Schottky clamped open collector output transistor.

The output signal from optocoupler 227 to filter 228 is a ground referenced square wave. Filter 228 removes any DC bias voltage and passes the output to frequency-to-voltage converter 229. The output of converter 229 is level shifted to yield a signal voltage level which is a linear function of temperature. The measurement of the voltage, V, is used to derive temperature in accordance with the relationship:

$$T = 237.5 - (40.625) \times V \tag{1}$$

where V is measured in volts DC, and T is measured in °F. The resultant output of amplifier 230 is an electrical signal of the subsurface temperature measurement, which can be displayed, recorded and used for temperature correction of the pressure measurement signals.

The need for a temperature corrected pressure measurement arises from the temperature induced errors present in the pressure measurements of all forms of pressure transducers. In one embodiment, providing temperature correction for the quartz pressure gauge pressure is corrected as a function of frequency in accordance with the relationship:

$$P(F,T) = G(T) + Fx(H(T) + Fx(I(T) + FxJ(T))) \tag{2}$$

where:
P = pressure in PSIA
F = frequency in hertz
T = temperature in degrees Fahrenheit.
The coefficients are given by a cubic in temperature:

$$G(T) = G0 + Tx(G1 + Tx(G2 + TxG3)) \tag{3}$$

$$H(T) = H0 + Tx(H1 + Tx(H2 + TxH3)) \tag{4}$$

$$I(T) = I0 + Tx(I1 + Tx(I2 + TxI3)) \tag{5}$$

$$J(T) = J0 + Tx(J1 + Tx(J2 + TxJ3)) \tag{6}$$

where G0-G3, H0-H3, I0-I3 and J0-J3 are derived from calibration data of the pressure transducer over selected temperature and pressure ranges of operation.

In a second embodiment, a method of correction both quartz and strain gauge pressure measurements for temperature is provided. In this embodiment temperature and frequency of the quartz gauge pressure signal are measured and an iterative procedure is used to derive the corrected formation pressure. Frequency is a function of pressure and temperature as represented by the relationship:

$$F(P,T) = G(T) + Px(H(T) + Px(I(T) + PxJ(T))) \tag{7}$$

where:
F = frequency in hertz
P = pressure in PSIA
T = temperature in degrees Fahrenheit.
In this embodiment temperature and the strain gauge pressure signal are measured and an iterative procedure is used to derive the corrected formation pressure. DC voltage is a function of pressure and temperature as represented by the relationship:

$$V(P,T) = G(T) + Px(H(T) + Px(I(T) + PxJ(T))) \tag{8}$$

where:
V = DC voltage representing uncorrected strain gauge pressure
P = pressure in PSIA
T = temperature in degrees Fahrenheit.
The coefficients are given by a cubic in temperature:

$$G(T) = G0 + Tx(G1 + Tx(G2 + TxG3 + TxG4))) \tag{9}$$

$$H(T) = H0 + Tx(H1 + Tx(H2 + TxH3 + TxH4))) \tag{10}$$

$$I(T) = I0 + Tx(I1 + Tx(I2 + TxI3 + TxI4))) \tag{11}$$

$$J(T) = J0 + Tx(J1 + Tx(J2 + TxJ3 + TxJ4))) \tag{12}$$

where G0-G4, H0-H4, I0-I4 and J0-J4 are derived from calibration data of the pressure transducer over selected temperature and pressure ranges of operation. Accordingly it should be clearly understood the form of the invention described and illustrated herein is exemplary only, and is not intended as a limitation on the scope of the present invention.

The embodiments of the invention in which an exclusive property or privilege is claimed are defined as follows:

1. Apparatus for obtaining temperature corrected pressure measurement characteristics of a connate fluid sample from subsurface earth formations traversed by a borehole, comprising:
   a body member for positioning in a borehole;
   a sample probe cooperatively arranged on and extensible from said body member into the earth formations;
   pressure sensing means coupled to said sampling probe for measuring the pressure of a connate fluid sample from said earth formations, said pressure sensing means including a first strain gauge pressure transducer pressure sensor for generating a first pressure measurement and a second pressure sensor for generating a second pressure measurement;

temperature sensing means coupled to said sampling probe for simultaneously measuring the temperature of said connate fluid sample from said earth formations; and means for correcting the first and second pressure measurements as a function of said temperature measurement.

2. The apparatus for obtaining characteristics of connate fluid sample of claim 1 wherein said second pressure sensor comprises a quartz gauge pressure transducer.

3. The apparatus for obtaining characteristics of a connate fluid sample of claim 2 wherein said pressure sensing means further comprises a pressure measuring means for providing electrical signals representative of the pressure of said connate fluid sample wherein said first pressure measurement is a d. c. signal and said second pressure measurement is a square-wave signal.

4. The apparatus for obtaining characteristics of a connate fluid sample of claim 3 wherein said pressure measuring means further comprises a strain gauge pressure transducer.

5. The apparatus for obtaining characteristics of a connate fluid sample of claim 3 wherein said pressure measuring means further comprises:
a strain gauge pressure transducer; and
a quartz gauge pressure transducer.

6. The apparatus for obtaining characteristics of a connate fluid sample of claim 3 wherein said temperature sensing means further comprises a temperature measuring means for producing a triangle-wave electrical signal representative of the temperature of said connate fluid sample.

7. The apparatus for obtaining characteristics of a connate fluid sample of claim 6 wherein said temperature measuring means further comprises an RTD temperature sensor.

8. The apparatus for obtaining characteristics of a connate fluid sample of claim 6 further comprising means for temperature correcting said pressure measurement signals.

9. The apparatus for obtaining characteristics of a connate fluid sample of claim 8 wherein said pressure measurement signals are corrected for temperature in accordance with the relationship:

$$P(F,T) = G(T) + Fx(H(T) + Fx(I(T) + Fx J(T)))$$

where:
P = pressure in PSIA
F = frequency in hertz
T = temperature in degrees Fahrenheit.

10. The apparatus for obtaining characteristics of a connate fluid sample of claim 6 further comprising transmission means for communicating said pressure measurement signals and said temperature measurement signal to said means for correcting said pressure measurements, wherein said transmission means further comprises a narrow-band frequency modulation transmission system.

11. The apparatus for obtaining characteristics of a connate fluid sample of claim 2 wherein said first and second pressure measurement signals are corrected for temperature in accordance with the relationship:

$$X(P,T) = G(T) + Px(H(T) + Px(I(T) + PxJ(T)))$$

where:
X = uncorrected pressure measurement, X being frequency for said second pressure measurement signal and X being voltage for said first pressure measurement signal
P = pressure in PSIA
T = temperature in degrees Fahrenheit
and the coefficients are given by:

$$G(T) = G0 + Tx(G1 + Tx(G2 + Tx(G3 + Tx\ G4)))$$

$$H(T) = H0 + Tx(H1 + Tx(H2 + Tx(H3 + Tx\ H4)))$$

$$I(T) + I0 + Tx(I1 + Tx(I2 + Tx(I3 + Tx\ I4)))$$

$$J(T) = J0 + Tx(J1 + Tx(J2 + Tx(J3 + Tx\ J4))).$$

12. Apparatus for measuring characteristics of connate fluid samples from subsurface earth formations traversed by a borehole, comprising:
a body member adapted for placement within the borehole;
a fluid sample probe cooperatively arranged on and extensible from said body member into the subsurface earth formations;
sample collection means cooperatively arranged on said body member for receiving and retaining a sample of the connate fluid from the subsurface formations;
a fluid passage coupled between said fluid sample probe and said sample collection means;
pressure measuring means coupled to said fluid passage for measuring the pressure of said connate fluid sample, said pressure measuring means including a first pressure sensor comprising a strain gauge pressure transducer for generating a first electrical output signal representative of a first pressure measurement and a second pressure sensor for generating a second electrical output signal representative of a second pressure measurement;
temperature measuring means coupled to said fluid passage for measuring the temperature of said connate fluid sample, said temperature measuring means generating an electrical output signal representative of said connate fluid temperature; and
means for correcting said first and second pressure measurement signals of said connate fluid sample as a function of said connate fluid sample temperature to provide a temperature-corrected pressure signal of the connate fluid.

13. The apparatus for measuring characteristics of fluid samples of claim 12 wherein said correcting means further comprises means for correcting said first pressure signal in accordance with the relationship:

$$P(F,T) = G(T) + Fx(H(T) + Fx(I(T) + Fx(J(T)))$$

where:
P = pressure in PSIA
F = frequency in hertz
T = temperature in degrees Fahrenheit.

14. The apparatus for measuring characteristics of fluid samples of claim 12 wherein said correcting means further comprises means for correcting said first and second pressure signals in accordance with the relationship:

$$X(P,T) = G(T) + Px(H(T) + Px(I(T) + PxJ(T)))$$

where:
X = uncorrected pressure measurement
P = pressure in PSIA
T = temperature in degrees Fahrenheit.

15. The apparatus for measuring characteristics of fluid samples of claim 12, wherein said second pressure sensor further comprises a quartz gauge pressure transducer.

16. The apparatus for measuring characteristics of fluid samples of claim 12 wherein said temperature measuring means further comprises:
a variable gain operational amplifier; and
an RTD temperature sensor in the feedback loop of said amplifier.

17. The apparatus for measuring characteristics of fluid samples of claim 12 further comprising means for transmitting said pressure measurement signals and temperature measurement signal to said correcting means.

18. The apparatus for measuring characteristics of fluid samples of claim 17 wherein said transmitting means further comprises a narrow-band frequency modulation transmission system.

19. Apparatus for measuring temperature corrected pressure characteristics of fluid samples from subsurface earth formations traversed by a borehole, comprising:
a body member for placement within a borehole;
a fluid sample probe cooperatively arranged on and extensible from said body member;
sample collection means cooperatively arranged on said body member for receiving a sample of fluids;
a fluid passage coupled between said fluid sample probe and said sample collection means;
first strain gauge pressure measuring means coupled to said fluid passage for measuring the pressure of said fluid sample and generating first electrical signals representative thereof;
second quartz gauge pressure measuring means coupled to said fluid passage for measuring the pressure of said fluid sample and generating second electrical signals representative thereof;
temperature measuring means coupled to said fluid passage for measuring the temperature of said fluid sample and generating a third electrical signal representative thereof;
means for transmitting said first and second pressure measurement signals and said third temperature measurement signals, said transmitting means including a narrow-band frequency modulation transmission system; and
means coupled to said transmission means for correcting said first and second pressure signals as a function of said third temperature signals to provide a temperature corrected pressure signal.

20. The apparatus of claim 19 wherein said means for transmitting said measurements further comprises:
first circuit means coupled to said first strain gauge pressure measuring means for providing an output voltage proportional to said pressure;
second circuit means coupled to said second quartz gauge pressure measuring means for providing an output frequency proportional to said pressure;
third circuit means coupled to said temperature measuring means for providing an output proportional to said temperature; and
summing line driver means coupled to said first, second and third circuit means for providing a frequency multiplexed composite output signal.

21. The apparatus of claim 20 wherein said first circuit means further comprises:
a calibration circuit;
a differential amplifier circuit having a first input coupled to said first pressure measuring means and a second input coupled to said calibration circuit; and
an amplifier circuit having an input coupled to said differential circuit and an output coupled to said summing line driver means.

22. The apparatus of claim 20 wherein said second circuit means further comprises:
a signal coupler circuit; and
an amplifier circuit having an input coupled to said signal coupler circuit and an output coupled to said summing line driver means.

23. The apparatus of claim 20 wherein said third circuit means further comprises:
an amplifier circuit having said temperature measuring means coupled into a feedback loop;
voltage to frequency converter circuit having an input coupled to said amplifier circuit;
a divider circuit coupled to said voltage to frequency converter circuit; and
an integrater circuit coupled to said divider circuit for converting the output of said divider circuit into an integrated output signal.

24. The apparatus of claim 20 wherein said means for transmitting said measurement further comprises:
fourth circuit means for processing said composite signal and generating an output electrical signal proportional to pressure measured by said first strain gauge pressure measuring means;
fifth circuit means for processing said composite signal and generating an output electrical signal proportional to pressure measured by said second quartz gauge pressure measuring means; and
sixth circuit means for processing said composite signal and generating an output electrical signal proportional to temperature measured by said temperature measuring means.

25. The apparatus of claim 24 wherein said fourth circuit means further comprises:
a differential amplifier circuit; and
a filter circuit coupled to said differential amplifier means.

26. The apparatus of claim 24 wherein said fifth circuit means further comprises:
a differential amplifier circuit;
a pressure gauge discriminator circuit having an input coupled to said differential amplifier circuit; and
an optocoupler circuit having an input coupled to said pressure gauge discriminator circuit.

27. The apparatus of claim 26 wherein said pressure gauge discriminator circuit further comprises:
a filter circuit; and
a phase-locked loop circuit having an input coupled to said filter circuit and an output coupled to said optocoupler circuit.

28. The apparatus of claim 24 wherein said sixth circuit means further comprises:
a differential amplifier circuit;

a temperature discriminator circuit having an input coupled to said differential amplifier circuit;
an optocoupler circuit having an input coupled to said temperature discriminator circuit;
a frequency to voltage converter circuit having an input coupled to said optocoupler;
a voltage reference circuit; and
a summing amplifier circuit having a first input coupled to said frequency to voltage converter and a second input coupled to said voltage reference circuit.

29. The apparatus of claim 28 wherein said temperature discriminator circuit further comprises:
a filter circuit; and
a phase-locked loop circuit having an input coupled to said filter circuit and an output coupled to said optocoupler circuit.

* * * * *